July 18, 1933.　　　　B. HARPSTER　　　　1,918,264
EYESHADE
Filed June 17, 1932
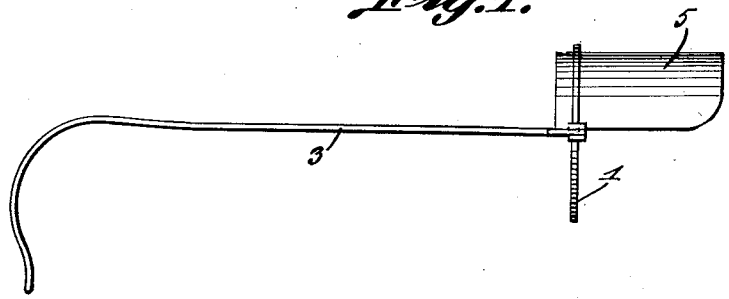
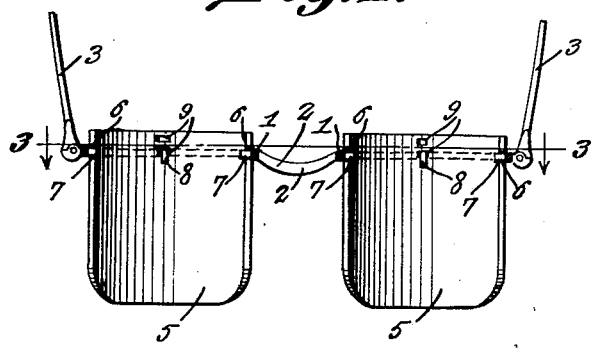
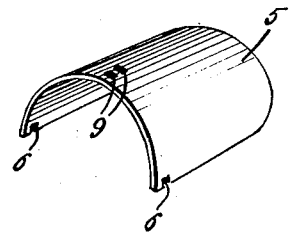
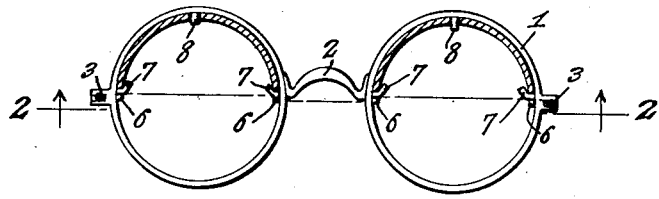
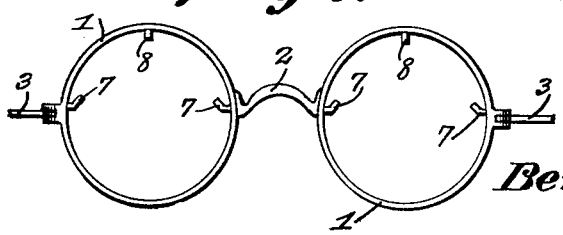
Bert Harpster, INVENTOR
BY Victor J. Evans & Co.
ATTORNEY Patented July 18, 1933

1,918,264

UNITED STATES PATENT OFFICE

BERT HARPSTER, OF BEATRICE, NEBRASKA

EYESHADE

Application filed June 17, 1932. Serial No. 617,851.

This invention relates to eye shades or shields especially adapted for protecting a person's eyes from glare either from the sun or from headlights of automobiles and has for the primary object, the provision of a device of the above stated character which may be conveniently and comfortably worn by a person and having glare shielding portions normally giving clear or unobstructed vision to the person, however, with a slight movement of the person's head said portions may be brought into the person's line of vision so that glare from headlights or sun will be reduced to a minimum, permitting the person to see without the vision being impaired.

With this and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a side elevation illustrating an eye shade or shield constructed in accordance with my invention.

Figure 2 is a fragmentary bottom plan view illustrating the same.

Figure 3 is a sectional view taken on the line 3—3 of Figure 2.

Figure 4 is a perspective view illustrating one of the shielding portions.

Figure 5 is a front elevation illustrating a modified form of frame with the shielding portions removed.

Figure 6 is a front elevation illustrating the frame shown in Figures 1, 2 and 3 with the shielding portions removed.

Referring in detail to the drawing, the numeral 1 indicates annular frames connected by a nose-piece 2 and each frame provided with temple bars 3 whereby the device may be worn as spectacles. The frames 1 carry shield portions 5 so arranged that the normal vision of a person will not be obstructed thereby, however, a slight downward tilting of the head of the person brings the shielding portions in alignment with the vision so that rays of strong lights can be readily looked at through the shielding portions without impairing the person's vision. The shielding portions are of semi-transparent material and of any desired color which is capable of reducing glare. The shielding portions are transversely curved to form each into substantially semi-cylindrical shape and said shielding portions may form an integral part of the frames 1 or may be detachably connected thereto as shown in the drawing.

The shielding portions are preferably constructed with notches 6 to receive lugs 7 formed on the frames 1 as shown in Figure 3. The frames are also provided with lugs 8 adapted to be received within openings 9 of the shield cooperating with the lugs 7 in detachably and adjustably securing the shielding portions in place on the frames.

The diameter of the shielding portions is slightly greater than the diameter of the frames so that said shielding portions must be contracted slightly to be applied to the frame and thereby frictionally engage the frame aiding in maintaining the shielding portions in place on the lugs. If desired the frames may be of semi-circular shape as shown at 10 in Figure 5.

From the foregoing description taken in connection with the accompanying drawing it will be seen that a device has been provided which can be worn similar to spectacles and will be comfortable to the user with effective shades or shields for the eyes which normally do not obstruct the vision of a person but in case of approaching automobiles with strong headlights illuminated, the person may tilt the head to bring the shields between the line of vision and the headlights so that the rays of light will not impair or affect the person's vision.

While I have shown and described the preferred embodiment of my invention, it will be understood that minor changes in construction, combination and arrangement of parts may be made without departing from the spirit and scope of my invention, as claimed.

Having thus described my invention, what I claim is:—

An eye shade comprising a pair of connected frames, hook-shaped elements carried by opposite sides of the frames, shade elements having notches at opposite edges to receive the hook-shaped elements and each provided with spaced openings midway between the notches, and a projection on each frame to engage in either of the openings of the respective shade element for adjusting the shade element relative to the frame.

In testimony whereof I affix my signature.

BERT HARPSTER.